UNITED STATES PATENT OFFICE.

JEAN EFFRONT, OF BRUSSELS, BELGIUM.

PROCESS FOR THE MANUFACTURE OF KETONES.

1,048,814.     Specification of Letters Patent.     Patented Dec. 31, 1912.

No Drawing.     Application filed February 21, 1912. Serial No. 679,085.

*To all whom it may concern:*

Be it known that I, JEAN EFFRONT, a subject of the Czar of Russia, residing at Brussels, Belgium, have invented a new and useful Process for the Manufacture of Ketones; and I do hereby declare the following to be a full, clear, and exact description of the same.

At present ketones are produced either by calcining salts of fatty volatile acids or by causing vapors of volatile organic acids to pass over lime at a high temperature. Such processes have not given satisfactory results. The calcining of acetates, etc., is a very long operation and is always accompanied by a considerable loss of acid. Also, the distillation of acids on lime offers very great difficulties. The lime swells up and finally chokes the apparatus and soon becomes inoperative as it is vitrified. Moreover, a certain proportion of acid is destroyed, and mixed ketones are formed, more particularly when the process is carried with a mixture of organic acids. It has been attempted to replace lime by other metallic oxids such as those of thorium, uranium, wolfram, aluminium, etc. With these catalyzers it has been possible to obtain satisfactory results in the laboratory, but it has been impossible to apply them on a large scale, as it was necessary to regenerate the oxids at the end of the operation.

The present invention is based on the observation that coke or charcoal form first class catalyzers for converting volatile fatty acids into ketones. By passing a mixture of vapor of concentrated acids and water over coke heated to between 350° and 450°, the various fatty acids are converted in a quantitative manner into ketones. When a mixture of acids is used, it is possible to avoid formation of mixed ketones.

The process is carried out in practice in the following manner: Small pieces of coke properly washed and deprived of dust, are placed in an iron tube 10–12 mm. in section and 5–10 meters long. Over the said coke raised to a temperature of about 350°–450°, is passed a mixture of vapors of concentrated acid and water, or vapors of diluted acid. For example, with 100 parts of pure acid passing through the apparatus, there may be used from 50 to 100 parts of water, in the form of vapor. At the outlet of the furnace is arranged a refrigerator for condensing the vapors of ketones. The length of the tube, in proportion to the section and to the yield of the apparatus, are adjusted so that at the outlet of the furnace no vapors of acid appear. The heating of the furnace is regulated, so that no combustible gas escapes, but only $CO_2$. Moreover, the temperature can be regulated in accordance with the quantity of steam admitted—that is, the temperature is regulated on one side by the opening and closing of burners, that is to say by the admission cocks of the combustible gases in the stove. It can moreover be thus regulated by the change which is made in the admission of the steam with the acids. When the temperature is found to be too high and the oven is hard to regulate by the burners—which may sometimes happen when working with concentrated acids with a view to their transformation into acetones—steam is caused to enter the tube at the same time as the acids, and it is by the entry of these vapors in a more or less large quantity that the temperature of the oven is regulated. The ketones obtained are then rectified in the ordinary way.

The process is also applicable to a mixture of acids, so that a mixture of simple ketones is obtained, and no mixed ketones. Moreover, the same coke can be used almost indefinitely without any treatment.

Having fully described the nature of my invention, what I claim and desire to secure by Letters Patent is:

A process for the manufacture of ketones, said process consisting in passing a mixture of the vapors of water and an organic acid through coke maintained at a temperature of 350 to 450 degrees centigrade.

In testimony whereof, I have signed my name to this specification in the presence of two subscribing witnesses.

JEAN EFFRONT.

Witnesses:
F. JOSEPH LABARREF,
ALFRED WUNDERLICH.